Aug. 18, 1964
H. H. BREAULT
3,145,085
PRODUCTION OF HIGH PURITY NITROGEN
Filed March 23, 1961
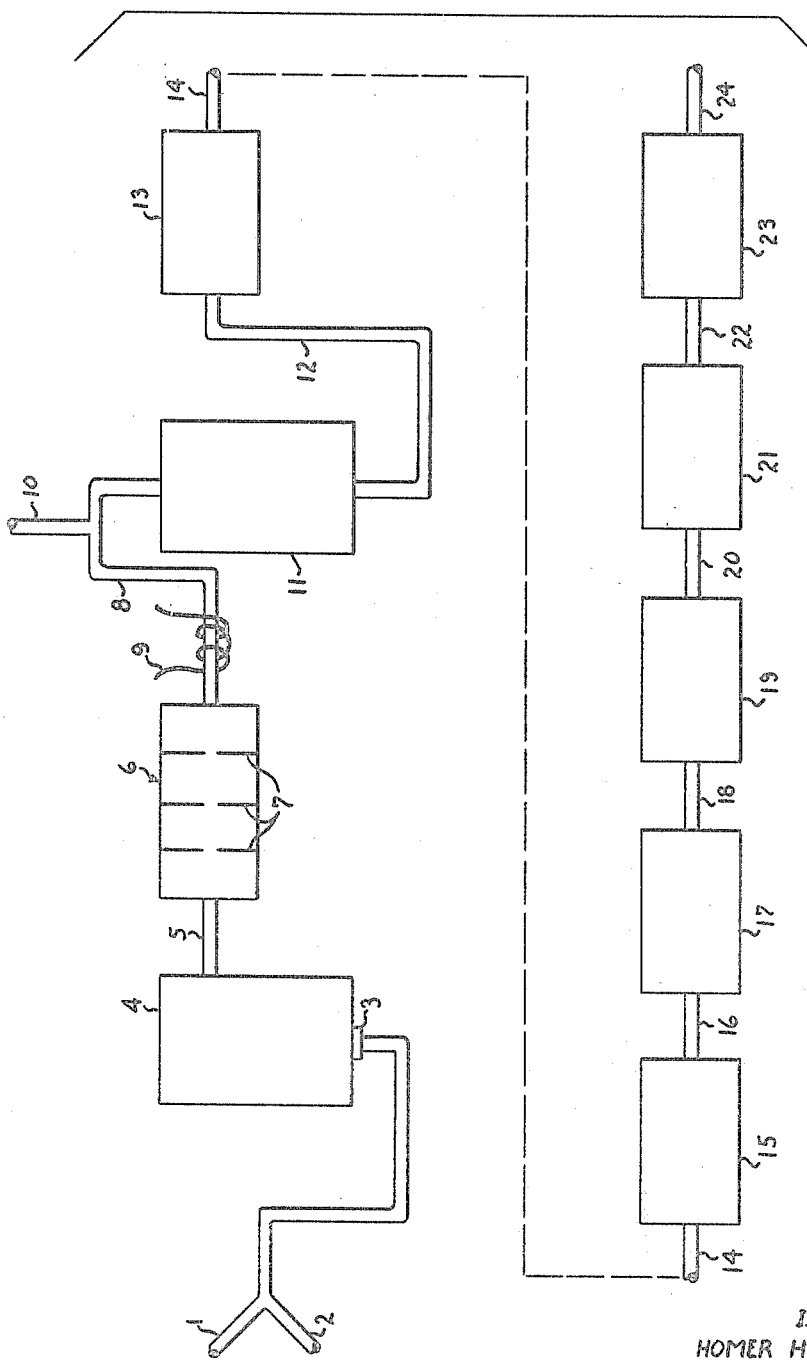
INVENTOR.
HOMER H. BREAULT
BY *Vernon F. Kalb*
ATTORNEY United States Patent Office 3,145,085
Patented Aug. 18, 1964

3,145,085
PRODUCTION OF HIGH PURITY NITROGEN
Homer H. Breault, Shelbyville, Ind., assignor to General Electric Company, a corporation of New York
Filed Mar. 23, 1961, Ser. No. 97,853
6 Claims. (Cl. 23—220)

This invention relates to apparatus for and the production of high purity nitrogen. More particularly, it relates to the production of high purity nitrogen in which a unique method of preventing fluctuations in the gas flow at a critical point in the process is provided.

In the past, high purity nitrogen has been produced in large plants with the nitrogen being purified, compressed and distributed to the user in heavy cylinders. With the increase in use of nitrogen for various metallurgical and other processes, it has become obvious that nitrogen must be provided without the expense of compressing and packaging if its optimum use in the various process industries is to be economically and fully realized. This economic pressure for the production of cheaper nitrogen at the point of actual use has resulted in the provision of relatively small package plants for the production of nitrogen at the plant of the ultimate user.

The processes used generally involve the combustion of a mixture of air and a fuel gas, using a slight excess of gas, after which the carbon dioxide, water vapor and gases other than the nitrogen, are removed. In one process, the combustion gases are heated and fed into a unit containing a noble metal catalyst, such as palladium-platinum, along with sufficient oxygen to insure complete oxidation of any carbon monoxide and hydrogen. The treated gas stream is next cooled and water separated therefrom. The effluent gas is next sent into a carbon dioxide scrubbing unit, such as a tower packed with Raschig rings, a ceramic filler irrigated with an ethanolamine solution such as a monoethanolamine solution, the amine scrubbing out the carbon dioxide. After the carbon dioxide has been removed, any fog droplets are removed and the gas is cooled to a temperature which facilitates the removal of the water, and finally, the gas is dried and any remaining trace of carbon dioxide removed to produce a final effluent gas containing about 99.99+ percent by volume nitrogen, including inert atmospheric materials, such as argon, krypton, etc.

While the process described above is very useful for many purposes, it has been found that unless the excess oxygen content of the mixture during the carbon monoxide and hydrogen oxidation step is very carefully and finely controlled, either too much oxygen is present or else insufficient oxygen is available to consume all the carbon monoxide and hydrogen present. It has been found that an excess of oxygen of about 50 parts per million of gas is suitable, such amount insuring reaction of all carbon monoxide and hydrogen and, at the same time, providing an amount of oxygen which is small enough so that any excess remaining produces a relatively inert final gas.

Of course, in actual practice the oxygen flow itself is very readily and precisely controlled. However, it has been found that the combustion gases entering the oxidizing chamber are subject to periodic fluctuations or high frequency disturbances so that the exact composition of gas and more particularly the carbon monoxide and hydrogen content of the gas entering the oxidation chamber at any time is subject to change. It will be realized at once that since an excess of oxygen of about only 50 parts per million of entering gas calculated on a uniform input gas basis is prescribed to provide a suitable effluent gas, such fluctuations make very difficult the precise removal of carbon monoxide and hydrogen and hence the production of a suitable final product.

A principal object, therefore, of this invention is to provide means for damping or removing high frequency or other composition-varying disturbances in the flow of gas after primary combustion and prior to entry into the oxidation chamber for removal of carbon monoxide and hydrogen so that the exact amount of excess oxygen may be added for most efficiently carrying out such removal.

Briefly, the invention relates to means, in the production of high purity nitrogen through the burning of gases containing hydrocarbons with subsequent removal of other constituents such as carbon monoxide and hydrogen, for damping or removing fluctuations in the flow of the combustion gases by providing a baffle chamber by means of which such fluctuations are removed or substantially reduced.

Those features of the invention which are believed to be novel are set forth with particularity in the claims appended hereto. The invention will, however, be better understood from a consideration of the following description and the drawing in which the single figure is a diagrammatic representation of a process for producing high purity nitrogen with particular reference to the means for damping the disturbances in the gas flow which is the subject matter of this invention.

As pointed out above, high purity nitrogen can be produced by the combustion of hydrocarbon containing gases in air or other oxidizing substance, the carbon monoxide and hydrogen being removed by passage of the gas through a chamber containing a noble catalyst, such as palladium, platinum, etc. and mixtures thereof in the presence of a slight excess of oxygen of the order of 50 parts by volume per one million parts of combustion gas to be treated. It has been found that only by such precise control of the excess oxygen may the carbon monoxide and hydrogen in the combustion gases be effectively removed. As pointed out hereinbefore, the combustion gases during their flow to the oxidation chamber are subject to vibrations or fluctuations such that the composition of the combustion gases, particularly with reference to its carbon monoxide and hydrogen content, may vary from one moment to the next. It will at once be realized, as pointed out above, that precise control of oxygen with respect to the combustion gas is impractical and impossible under such circumstances without some means to smooth out or remove underlying disturbances which cause the fluctuation in gas content.

It has been found that such vibrations with their resultant fluctuations in gas content may be very readily damped or removed by passing the combustion gas before treatment through a tank or receptacle containing baffles or a series of mixing compartments or tanks such that the gases, while passing through such receptacle, are thoroughly mixed to provide an effluent gas which has a constant analysis or constituent content. It has been found that a fluctuation damping tank containing preferably three baffles or a series of four connected receptacles will very effectively damp fluctuations in the gas flow and hence variations in its content if the size of each compartment is equal to about one-fourth of the gas volume conveyed through the system each minute. For example, in a damping tank 10 feet long and 3 feet in diameter, with three baffles equally spaced throughout the receptacle so that the ratio of the diameter of the tank to the length of the compartment is no less than one, vibrations and fluctuations are substantially removed as compared to treatment with no baffles. Using fewer baffles in a tank such as that above, proportionately poorer results are obtained to the point that where no baffle is used, the vibrations or fluctuations are reduced only about 50 percent. Generally speaking, for a flow of 1000 cu. ft. per hour of combustion gases for treatment, the damping tank should have a total volume of at least 35 cu. ft. and, as pointed out above, the dimensions of each baffled portion within the tank should be such that the ratio between the diameter of the tank and the length of each compartment produced by the baffles is no less than 1:1. For a tank of the above size having a capacity of 1000 cu. ft. per hour, the centrally located passage holes or passage orifices from one baffle compartment to another as well as the entry and exit orifices are about 1½" in diameter. This precludes the establishment of a preferential gas flow path from inlet to outlet such as might be established where a small inlet and a relatively large outlet are used. Ordinarily the inlet and outlet pipings are of the same size as used generally in the system. The important thing is to obtain good intermixing and diffusion in each part of the damping system. It will be realized that more than four chambers can be used, a larger number of tanks or chambers reducing the required size for each unit. On the other hand, if a single tank were utilized, it would have to be about twenty times the size of one of the four chamber systems.

While the damping system has been shown herein for convenience as being in a particular place in the system, it can be placed anywhere therein so long as it precedes the oxidation unit. In turn, the oxidation unit can be shifted as desired after the combustion unit.

It will thus be seen that the dimensions of larger or smaller damping tanks to treat different amounts of gas flow may be proportioned accordingly.

Referring to the drawing of a typical system for the production of nitrogen, there is shown schematically an air line 1 and gas line 2 which join and terminate in a mixing nozzle 3 in combustion chamber 4. Chamber 4 is typically a refractory lined combustion chamber filled with a catalyst such as nickel and the like supported on the refractory carrier to insure reforming of any hydrocarbon content of the gas to carbon monoxide and hydrogen. The effluent gases leaving the combustion chamber 4 are typically at a temperature of about 300° F. The effluent combustion product gas is led through line 5 to the damping chamber 6 which is the subject of the invention. As shown, this tank contains three equally spaced baffles 7 defining spaces or reservoirs within the tank such that each such reservoir is capable of storing at any one time or containing a supply of the gas stream equal to that produced during a one-quarter minute period. As a result of the damping action in chamber 6, the gas effluent therefrom is essentially uniform in composition. In line 8 conveying the effluent gases from the damping chamber, such gases are heated to a temperature typically of from about 500° F. to 650° F. as by heating coil 9 or other suitable means after which a slight precise excess of oxygen or air necessary to completely burn the carbon monoxide and hydrogen content is fed into the stream as at 10. If the fluctuations in the gas content are not previously damped, it is impossible to consistently and accurately adjust this excess oxygen content. The gas with the precise excess of oxygen amounting to about 50 parts per million parts by volume of gas is next conducted into oxidation tank 11 which contains a packed bed of noble metal catalyst such as palladium, platinum and the like and mixtures of such metals. During passage through the tank, all traces of carbon monoxide and hydrogen are removed. Passing from the oxidizing tank 11 through conduit 12 the gas stream is next cooled in a cooler 13 which may be of any desired design but which is typically a shell and tube type cooler using water as the cooling medium. Having been cooled, the effluent gas passing through conduit 14 is treated to separate out any water by any usual means such as a knockout drum being very suitable for this purpose. The gas then passes through conduit 16 into a carbon dioxide scrubbing or removing tank 17 which is irrigated with an ethanolamine solution running countercurrent to the stream flow. This amine, which may be any of the usual ethanolamines, such as triethanolamine, diethanolamine and monoethanolamine, effectively removes the carbon dioxide from the gas. The gas next passes through conduit 18 into tank 19 where any fog or liquid droplets in the gas are filtered out or separated. Next the gas passing through conduit 20 is refrigerated to a temperature of approximately 40° F. preparatory to removal of the water present therein. Conduit 22 leads the gas to the drying bed which may typically be of a zeolite type for removing water down to a dew point of approximately −80° F. to −100° F. The zeolite also serves the purpose of removing trace impurities such as carbon dioxide, oxides of nitrogen and sulfur compounds which may be present in the gas stream. From the drying bed 23 the final effluent gas passes through conduit 24 to its point of further use.

It has been found that the above process produces a final gas product containing les than five parts per million each of carbon monoxide, hydrogen and carbon dioxide along with the slight excess of oxygen, the balance being 99.99+ percent nitrogen, including other inerts such as argon, etc.

There is provided then by the present invention in the process of producing high purity nitrogen by the combustion of hydrocarbon gases means for reducing fluctuations in the gas stream composition after combustion and before oxidation of the carbon monoxide and hydrogen in said stream with a precisely controlled amount of oxidizing agent, such as oxygen or air. With such smoothing out of the gas stream composition, precise control of such oxidation and hence production of high purity nitrogen is greatly facilitated.

What I claim as new and desire to secure by Letters Patent of the United States is:

1. In the production of high purity nitrogen gas from the combustion of hydrocarbon gas in which the quantities of carbon monoxide and hydrogen of the combustion product are reduced by oxidation with a precise excess of oxygen, the process of reducing fluctuations in the combustion product gas stream composition before introduction of said oxygen which comprises passing said stream through a baffled tank.

2. In the production of high purity nitrogen gas from the combustion of hydrocarbon containing gas in which the quantities of carbon monoxide and hydrogen of the combustion product are reduced by oxidation with a precise excess of oxygen, the process which comprises thoroughly mixing said gas stream to reduce fluctuations in the combustion product gas stream composition before introduction of said oxygen.

3. In the production of high purity nitrogen gas from the combustion of hydrocarbon containing gas in which the quantities of carbon monoxide and hydrogen of the combustion product are reduced by oxidation with a precise excess of oxygen, the process of reducing fluctuations in the combustion product gas stream composition before introduction of said oxygen which comprises thoroughly mixing said gas stream in a series of mixing chambers.

4. In the production of high purity nitrogen gas from the combustion of hydrocarbon containing gas in which the quantities of carbon monoxide and hydrogen of the combustion product are reduced by oxidation with a precise excess of oxygen, the process of reducing fluctuation in the combustion product gas stream composition before introduction of said oxygen, which comprises thoroughly mixing said gas stream by passing said gas stream through a series of receptacles in such manner that a quantity equal to about one-quarter of the gas flow per minute is contained in each receptacle.

5. In the production of high purity nitrogen gas from the combustion of hydrocarbon containing gas in which quantities of carbon monoxide and hydrogen of the combustion product are reduced by oxidation with a precise excess of oxygen, the process of reducing fluctuation in the combustion product gas stream composition before introduction of said oxygen, which comprises thoroughly mixing said gas stream by passing said gas stream through a baffled tank in such manner that each compartment of said baffled tank contains a quantity equal to about one-quarter of the gas flow per minute.

6. In the production of high purity nitrogen gas from the combustion of hydrocarbon containing gas in which the quantities of carbon monoxide and hydrogen of the combustion product are reduced by oxidation with a precise excess of oxygen, a process for reducing fluctuation in the combustion product gas stream composition before introduction of said oxygen, which comprises thoroughly mixing said gas stream by passing said stream through a baffled tank in such manner that each compartment of said baffled tank contains a quantity equal to no more than about one-quarter of the gas flow per minute, the ratio of the diameter of each compartment to the length of said compartment being no less than about one.

References Cited in the file of this patent

UNITED STATES PATENTS

| | | |
|---|---|---|
| 1,154,172 | Brownlee et al. | Sept. 21, 1915 |
| 2,042,665 | Kinzel | June 2, 1936 |
| 2,679,724 | Pomykala | June 1, 1954 |